United States Patent
Brelot et al.

[11] 3,784,309
[45] Jan. 8, 1974

[54] OPTICAL COMPARATOR WITH INTEGRATED REFLECTIVITY COMPENSATION

[75] Inventors: René Brelot, Paris; Jean Tourret, Montrouge, both of France

[73] Assignee: Compagnie Des Compteurs, Paris, France

[22] Filed: Aug. 5, 1971

[21] Appl. No.: 169,349

[30] Foreign Application Priority Data
Aug. 12, 1970 France.............................. 7029725

[52] U.S. Cl.................. 356/156, 356/5, 33/125 A, 356/209, 356/212, 250/227
[51] Int. Cl. ............................................. G01b 11/14
[58] Field of Search.................. 33/125 A; 356/209, 356/212, 156, 4, 5; 250/227

[56] References Cited
UNITED STATES PATENTS
3,263,087  7/1966  Goldman et al. ........................ 356/4
3,327,584  6/1907  Kissinger............................ 250/227

FOREIGN PATENTS OR APPLICATIONS
225,464  1/1969  U.S.S.R.................................. 356/4

Primary Examiner—Ronald L. Wibert
Assistant Examiner—Paul K. Godwin
Attorney—William B. Kerkam, Jr. et al.

[57] ABSTRACT

The variable relative distance d between the comparator and a test surface is measured by means of an optical system comprising a first glass-fiber bundle which directs a luminous flux to the surface and is surrounded by a second glass-fiber bundle which recieves the reflected flux and directs the flux to a receiver. The bundle of receiving fibers consists of three juxtaposed layers, namely a first layer which is adjacent to the emitting bundle and the fibers of which are directed towards a first receiver, a second intermediate layer in which 50 percent of the fibers are directed towards the first receiver and 50 percent of the fibers are directed towards a second receiver, and a third external layer of fibers directed towards the second receiver. The width of the intermediate layer is such that the value of d at which the signal of the first receiver is of maximum value is equal to the value of d at which the signal of the second receiver is located at the center at its linear range of variation.

4 Claims, 9 Drawing Figures

OPTICAL COMPARATOR WITH INTEGRATED REFLECTIVITY COMPENSATION

It is common practice to make use of optical comparators of the glass fiber type for the measurement of small lengths, for example the displacement of surfaces which are subjected to slow or fast vibrations.

FIG. 1 of the accompanying drawings shows diagrammatically the structural arrangement and the mode of utilization of the optical system of a known comparator of this type. A bundle of fibers 10 is oriented at right angles to the test surface 11 and in the direction of the displacements of said surface. This first bundle is surrounded by a second bundle through which the light reflected from the surface 11 is directed to a receiver (not shown) when the luminous flux which is transmitted from a light source (not shown) by the central bundle 10 shines on said surface 11. The receiver detects an output signal S which serves to measure the variations in the distance d between the test surface and the comparator.

The diagram of FIG. 2 is the characteristic curve of variations in the signal S as a function of the distance d ; the value of the signal starts from zero, increases at a uniform rate and passes through a maximum value, then decreases again. Two portions or ranges of this curve call for consideration :

a range having a width $\Delta_o$ in which the signal rises linearly ;

and a range having a width $\Delta_c$ in which it may be considered that the signal is constant and equal to its maximum value with a variation which does not exceed 1 percent.

If $S_o$ designates the signal within the linear range and $S_c$ designates the signal within the stationary range, we may write :

$$S_o = K\,r\,d$$
$$S_c = K'\,r$$

wherein $K$ and $K'$ are constants and $r$ is the coefficient of reflectivity of the surface. It is apparent that :

$$S_o/S_c = (K/K')\,d,$$

or in other words that this ratio is independent of the reflectivity.

In principle, in order to eliminate any possible variations in the value $r$, it is therefore only necessary to take measurements with two comparators, viz :

a first comparator or measuring detector of the optical-system type which operates within the linear range, a second comparator which operates as a reflectometer or compensating detector of the optical-system type which operates within the stationary zone.

The value of $d$ within the linear range will be given by the ratio of the two signals obtained which is proportional thereto.

However, this method is applicable only if the variations in reflectivity have a pseudo-pitch which is considerably larger than the distance between the measuring detector and the compensating detector. Should this not be the case, the measurement is therefore erroneous.

The aim of this invention is to make good this deficiency by taking a measurement of reflectivity within the same zone as that in which the distance is measured, this being carried out by means of one comparator alone.

The invention is concerned with an optical comparator of the type providing integrated reflectivity compensation in order to measure the variable relative distance $d$ between a comparator and a surface, the optical system of the comparator being constituted by a first glass-fiber bundle which emits a luminous flux towards the surface and is surrounded by a second glass-fiber bundle which receives the reflected flux and directs the flux to a receiver, characterized in that the bundle of receiving fibers of the optical system is constituted by three juxtaposed layers consisting of a first layer which is adjacent to the emitting bundle and the fibers of which are directed towards a first receiver, a second intermediate layer in which one fiber out of two is directed in alternate succession towards the first receiver and towards a second receiver, and a third external layer of fibers directed towards the second receiver, the width of the intermediate layer being so determined that the value of d at which the signal of the first receiver is of maximum value should be equal to the value of d at which the signal of the second receiver is located at the center of its linear range of variation.

The design concept of this measuring detector will become apparent from the considerations which are set forth hereinafter, reference being made to the accompanying drawings in which the intended arrangement of the bundle of receiving fibers of the optical system is shown by way of example but without any limitation being implied, and in which.

In the known method which was referred-to at the beginning of this description, it is necessary to operate under conditions such that the center $d_o$ of the linear range of the measuring comparator should coincide with the center $d_c$ of the stationary zone of the compensating detector and the width $\Delta_c$ of this zone must be at least equal to the scale of measurement. This is achieved by means of two detectors having mechanically displaced origins and different scales, which is impossible from a technological standpoint if it is desired to employ only one detector both for measurement and compensation even while the conditions relating to $d_o$, $d_c$ and $\Delta_c$ remain the same.

The aim of the present Applicant has therefore been to maintain the optical arrangements which permit the achievement of the same operating conditions by means of a single comparator.

Figure 2:
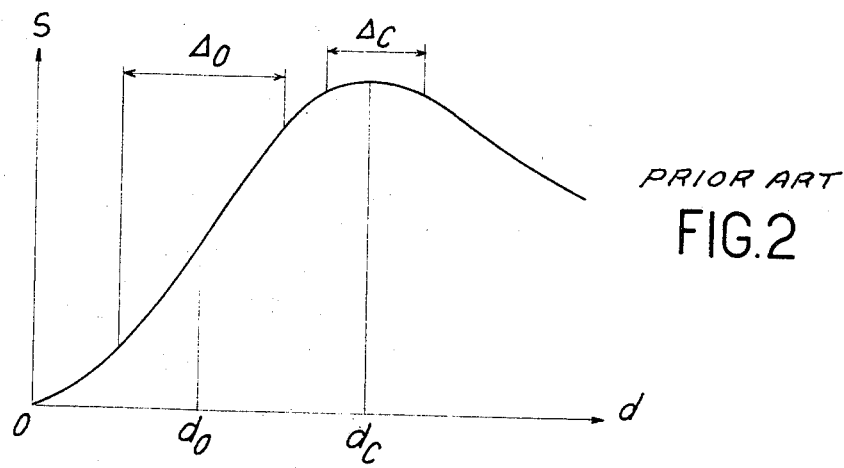
FIG. 2 is the characteristic curve of variations in the signal of the comparator of FIG. 1.

Consideration will now be given to the optical comparator system of FIG. 3 comprising two juxtaposed receiving layers 12 and 13 in which the layer 13 surrounds the layer 12 and in which the fibers of the layer 12 are directed towards a receiver $R_1$ while the fibers of the layer 13 are directed towards a receiver $R_2$. FIG. 4 is a diagram of the curves of variation of the output signals $S_1$ and $S_2$ respectively in the case of each receiver $R_1$, $R_2$. The two curves of $S_1$ and $S_2$ are similar to the curve of FIG. 2 but the origin of the curve $S_2$ ($S_2 = 0$) is displaced to the point of abscissa which corresponds to the center $d_{c1}$ of the stationary zone of the curve $S_1$ while the maximum value of the signal $S_2$ is lower than that of $S_1$.

It will now be postulated that, in each of the layers 12 and 13, one fiber out of two is directed towards one and the same detector or in other words that one-half of the fibers of each layer 12 and 13 is directed towards the receiver $R_1$ and the other half is directed towards the receiver $R_2$. There will accordingly be the same characteristic curve in the case of both receivers and this curve is plotted in broken lines ($S_1 + S_2$) in the diagram of FIG. 4. The case of FIG. 1 as applicable to a single layer of receiving fibers is thus again met with.

Figure 3:
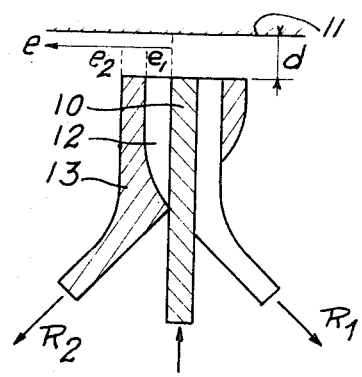
FIG. 3 is a diagrammatic sectional view of the optical system of a compensator having two juxtaposed receiving layers.
Figure 4:
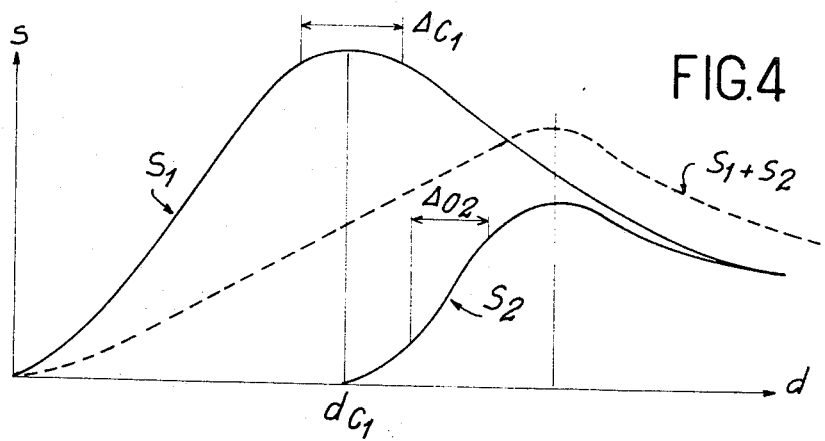
FIG. 4 is a diagram of the curves of signals which can be obtained by means of the optical system of FIG. 3 as a function of the density of fibers in the layers.

For the sake of clarity of the following description, the reference $e$ will designate the distance from the fibers of the detecting layers to the left-hand limit of the central emitting layer of the optical system of FIG. 3 ; the layer 12 extends to the distance $e_1$ and the layer 13 extends to the distance $e_2$ and it is postulated that $e_2 = 2 e_1$ ; this arrangement is also provided symmetrically on the right-hand side of the optical system.

Figure 5:
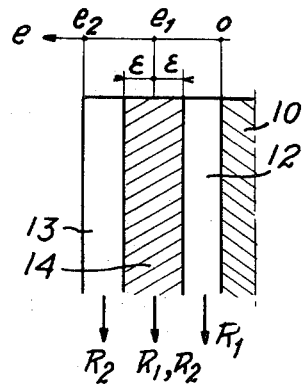
FIG. 5 is a diagrammatic longitudinal sectional view of an optical system having three receiving layers in which the intermediate layer is assumed to have a variable width.

A third intermediate receiving layer 14 will now be interposed between the layers 12 and 13 as shown in FIG. 5. The width $2\epsilon$ of this third layer is assumed to be variable and its mid-plane is located at the distance $e_1$. Let it be further assumed that the structure of said intermediate layer is such that the fibers of this latter are directed alternately towards the receivers $R_1$ and $R_2$ in a proportion of one fiber out of two. There is thus formed a whole series of detectors in which the optical systems of FIGS. 1 and 3 are only extreme cases :

FIG. 3 : $\epsilon = 0$

Figure 1:
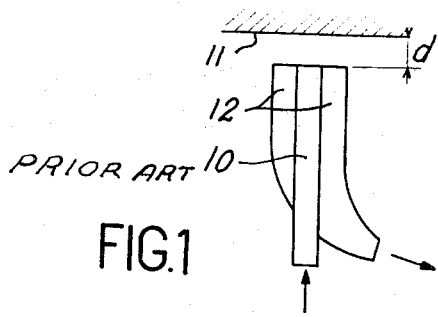
FIG. 1 shows the optical system of a comparator of the prior art.

FIG. 1 : $\epsilon = e_1 = e2/2$

In consequence, when $\epsilon$ varies between these two extreme values, the characteristic curves representing each optical system of the series remain between the curves $S_1$ and $S_2$ of FIG. 4.

Figure 6:
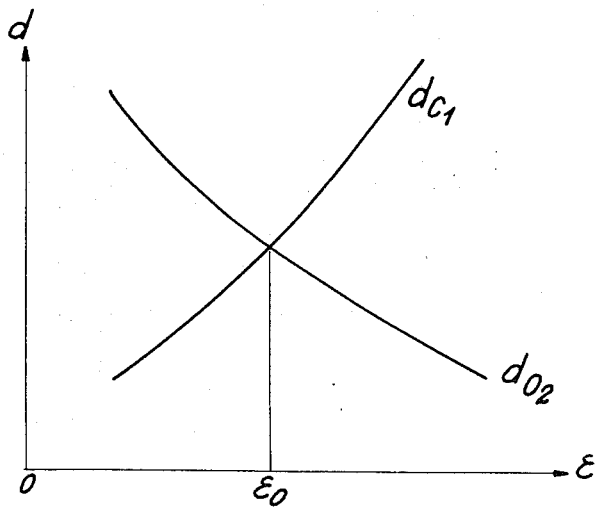
FIG. 6 is a diagram which serves to determine the width of the intermediate layer of the optical system of FIG. 5 as constructed according to the invention.

This means that the values $d_{c1}$, or distance corresponding to the maximum value of the signal $S_1$, and the value $d_{o2}$, or distance at which the signal $S_2$ is located at the center of its linear range, will vary with $\epsilon$, the value of $d_{c1}$ being intended to increase with $\epsilon$ while the value of $d_{o2}$ will decrease. There thus exists a value $\epsilon_o$ of $\epsilon$ at which we have :

$$d_{c1} = d_{o2}$$

and this value can be determined as shown in FIG. 6 by a plot of the two corresponding curves which meet at the point of abscissa $\epsilon_o$.

Figure 7:
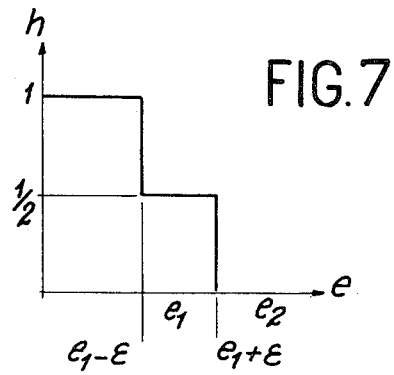
FIG. 7 is a diagram of the relative density n of the glass fibers which are directed towards a single receiver through the three receiving layers of the optical system of FIG. 5.

FIG. 7 provides in addition a general schematic diagram showing the relative density n of the fibers in the three layers as a function of the value of e in the case of the receiver $R_1$, for example.

Figure 8:
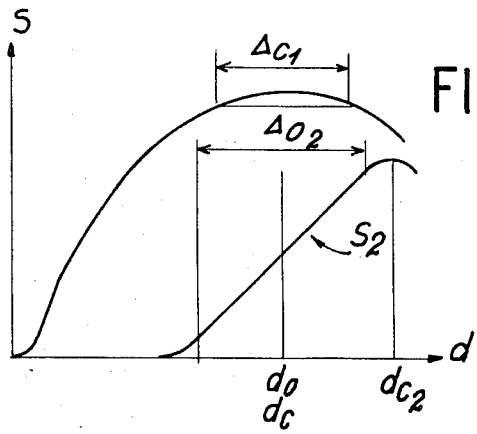
FIG. 8 is a diagram of the curves of the measurement and compensation output signals in the case of an optical system having three receiving layers as constructed in accordance with FIG. 6.

The optical system of a comparator in accordance with the invention will thus be obtained by constructing this latter in accordance with the indications given in FIGS. 5 to 7 and will operate as shown in FIG. 8 ; in other words, the receiver $R_2$ will operate in the case of the measurement ($d_{o2} = d_o$) and the receiver $R_1$ will operate in the case of the compensation ($d_{c1} = d_c$), $d_o$ and $d_c$ being in coincident relation, provided that the stationary range (to within a maximum of 1 percent) $\Delta_{c1} = \Delta_c$ and the linear range $\Delta_{o2} = \Delta_o$ both have a width at least equal to the desired scale of measurement or field of variation of $d$. It can be demonstrated in this connection that $\Delta_{o2}$ is always higher than $\Delta_{c1}$ as indicated in the diagram of FIG. 8 so that it is only necessary to choose for the optical system of FIG. 5 a value $e_1$ which is sufficiently high to correspond to a range of compensation $\Delta_{c1}$ of sufficient width.

Figure 9:
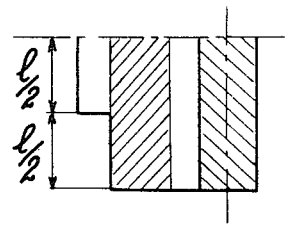
FIG. 9 is a view of the profile which is to be given by way of example to the rectangular transverse cross-section of an optical system having three receiving layers which operates in accordance with FIG. 8.

In order to prevent any abrupt change in sensitivity in the linear range of operation of the comparators (receiver R2), it is preferable to provide the transverse cross-section of the optical system with a suitable profile as shown in FIG. 9 in the particular case of detectors which have a rectangular transverse cross-section. This profile corresponds to a reduction of the receiving surface by one-half in order to compensate for the fact the fibers are directed alternately towards the two receivers and in a proportion of one fiber out of two.

What we claim is:

1. An optical comparator providing integrated reflectivity compensation to measure the variable relative distance d between the comparator and a surface, the optical system of the comparator being constituted by a first glass-fiber bundle which emits a reflected luminous flux towards the surface and is surrounded by a second glass-fiber bundle which receives the reflected flux and directs the flux to a receiver, wherein the bundle of receiving fibers is constituted by three juxtaposed layers consisting of a first layer which is adjacent to the emitting bundle and the fibers of which are directed towards a first receiver providing a signal, a second intermediate layer in which 50 percent of the fibers are directed towards the first receiver and 50 percent of the fibers are directed towards a second receiver providing a signal, and a third external layer of fibers directed towards the second receiver, the width of the intermediate layer being so determined that the value $d_{c1}$ of d at which the signal of the first receiver is of maximum value is equal to the value $d_{o2}$ of d at which the signal of the second receiver is located at the center of its linear range of variation.

2. An optical comparator according to claim 1, wherein the second receiver carries out the measurement and the first receiver carries out the compensation for reflectivity of the surface.

3. An optical comparator according to claim 1 wherein the width of the bundle of receiving layers remains constant while the intermediate layer has a stationary mid-plane.

4. An optical comparator according to claim 1, wherein the position of the mid-plane of the intermediate layer is determined so that the range of compensation of the first receiver when the signal remains equal to its maximum value to within 1 percent has a width at least equal to that of a measuring field in respect of the distance $d$.

* * * * *